US012608450B2

(12) United States Patent
Jones et al.

(10) Patent No.: US 12,608,450 B2
(45) Date of Patent: Apr. 21, 2026

(54) CONTROLLING GENERATION OF OBJECTS

(71) Applicant: Apple Inc., Cupertino, CA (US)

(72) Inventors: Scott R. Jones, San Rafael, CA (US);
Ronald V. Siy, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 115 days.

(21) Appl. No.: 18/088,297

(22) Filed: Dec. 23, 2022

(65) Prior Publication Data

US 2023/0185887 A1 Jun. 15, 2023

Related U.S. Application Data

(63) Continuation of application No. PCT/US2021/036173, filed on Jun. 7, 2021.

(60) Provisional application No. 63/046,083, filed on Jun. 30, 2020.

(51) Int. Cl.
*G06F 21/16* (2013.01)
*G06F 21/10* (2013.01)
*G06T 19/00* (2011.01)

(52) U.S. Cl.
CPC .............. *G06F 21/16* (2013.01); *G06F 21/10* (2013.01); *G06T 19/006* (2013.01); *G06F 2221/2141* (2013.01)

(58) Field of Classification Search
CPC .. G06F 21/16; G06F 21/10; G06F 2221/2141; G06T 19/006
See application file for complete search history.

(56) References Cited

U.S. PATENT DOCUMENTS

| | | | | |
|---|---|---|---|---|
| 11,182,576 B1 * | 11/2021 | Bhushan | ............... | G06T 19/006 |
| 11,531,992 B2 * | 12/2022 | Ritchie | .................. | G06F 16/29 |
| 11,776,220 B1 * | 10/2023 | Jones | ..................... | H04L 67/52 |
| | | | | 345/633 |
| 12,265,605 B2 * | 4/2025 | Lerch | ..................... | H04L 9/3228 |
| 12,442,915 B1 * | 10/2025 | Cohen | ................. | G01S 13/9021 |
| 2013/0215148 A1 * | 8/2013 | Antonyuk | ............... | G06F 3/017 |
| | | | | 345/633 |

(Continued)

FOREIGN PATENT DOCUMENTS

| | | | | |
|---|---|---|---|---|
| CN | 105378792 A | 3/2016 | | |
| CN | 106471542 A | 3/2017 | | |
| CN | 117897675 A | * 4/2024 | ............. | G06F 3/013 |

OTHER PUBLICATIONS

PCT International Search Report and Written Opinion dated Sep. 9, 2021, PCT International Application No. PCT/US2021/036173, pp. 1-11.

(Continued)

*Primary Examiner* — Dhairya A Patel
(74) *Attorney, Agent, or Firm* — Fernando & Partners, LLP

(57) ABSTRACT

Various implementations disclosed herein include devices, systems, and methods for using markers to inform the creation of graphical objects that represent objects. In some implementations, a method includes obtaining an image comprising a two-dimensional (2D) representation of an object. A request is obtained to utilize the image to generate a three-dimensional (3D) object that represents the object. The method includes determining whether the object is associated with a marker indicating reproducible aspect(s) of the object.

20 Claims, 8 Drawing Sheets

100↴

150↴

(56)　　　　　　References Cited

U.S. PATENT DOCUMENTS

| | | | | |
|---|---|---|---|---|
| 2014/0176609 A1* | 6/2014 | Gotoda | ............... | G02B 27/017 |
| | | | | 345/633 |
| 2015/0163345 A1 | 6/2015 | Cornaby et al. | | |
| 2015/0220291 A1* | 8/2015 | Tapley | .................. | G06F 3/1222 |
| | | | | 358/1.15 |
| 2015/0262412 A1* | 9/2015 | Gruber | .................... | G06T 15/50 |
| | | | | 345/426 |
| 2016/0078683 A1 | 3/2016 | Sudol et al. | | |
| 2016/0371804 A1* | 12/2016 | Yun | ......................... | G06F 21/86 |
| 2017/0164928 A1* | 6/2017 | Oh | ......................... | A61B 8/483 |
| 2017/0213320 A1* | 7/2017 | Yücer | ...................... | G06T 7/579 |
| 2017/0352172 A1* | 12/2017 | Lim | ......................... | G06F 3/14 |
| 2018/0012394 A1* | 1/2018 | Averianov | .............. | G06T 15/04 |
| 2018/0051982 A1* | 2/2018 | Yin | ......................... | G06T 7/596 |
| 2018/0276882 A1* | 9/2018 | Harviainen | ........... | G06T 19/006 |
| 2019/0130689 A1* | 5/2019 | Baumgarte | ........... | H04L 9/3242 |
| 2019/0311341 A1 | 10/2019 | Rice | | |
| 2020/0051280 A1* | 2/2020 | Urban | ...................... | G06T 7/50 |
| 2020/0094992 A1* | 3/2020 | Hoover | .................. | G06V 20/20 |
| 2020/0242648 A1* | 7/2020 | Glazier | ................. | H04L 67/535 |
| 2020/0250878 A1* | 8/2020 | Komissarov | ............ | G06T 15/04 |
| 2020/0410763 A1* | 12/2020 | Hare | ...................... | H04N 5/272 |
| 2022/0138913 A1* | 5/2022 | Huang | .................. | G06V 10/62 |
| | | | | 348/241 |
| 2025/0050421 A1* | 2/2025 | Buller | .................... | B22F 10/68 |
| 2025/0336037 A1* | 10/2025 | Baucum | ................. | G06V 10/44 |

OTHER PUBLICATIONS

Office Action for corresponding Chinese Appl. No. 202180046738.X dated Jan. 28, 2026 (translation of search report only).

* cited by examiner

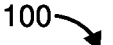
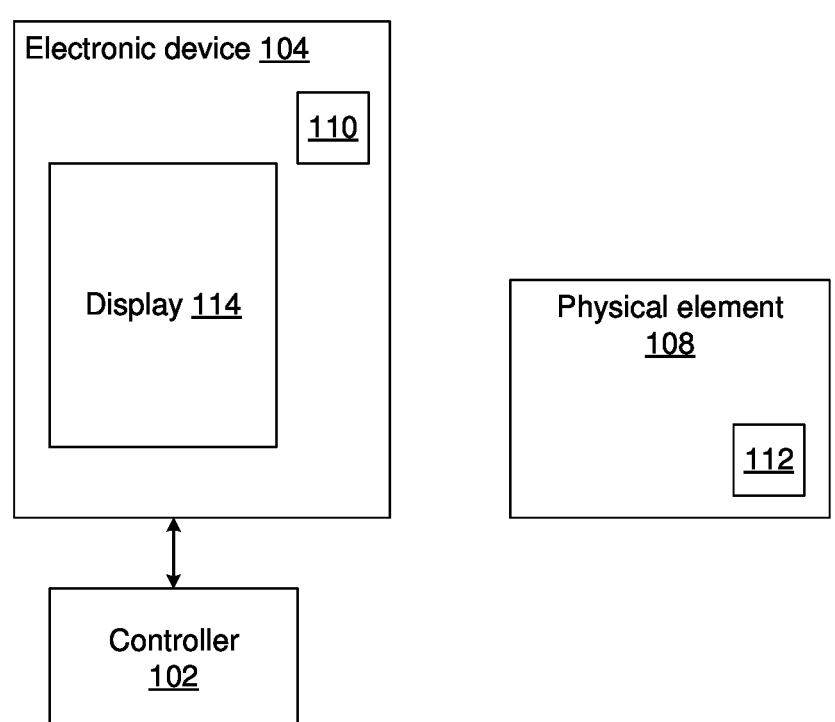
Figure 1A

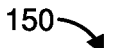
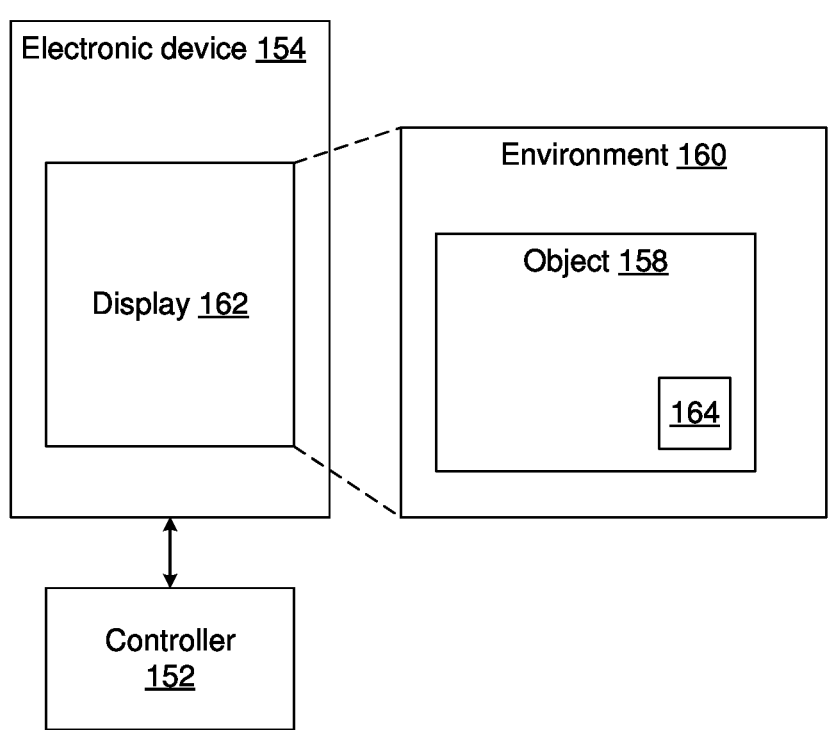
Figure 1B

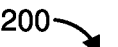
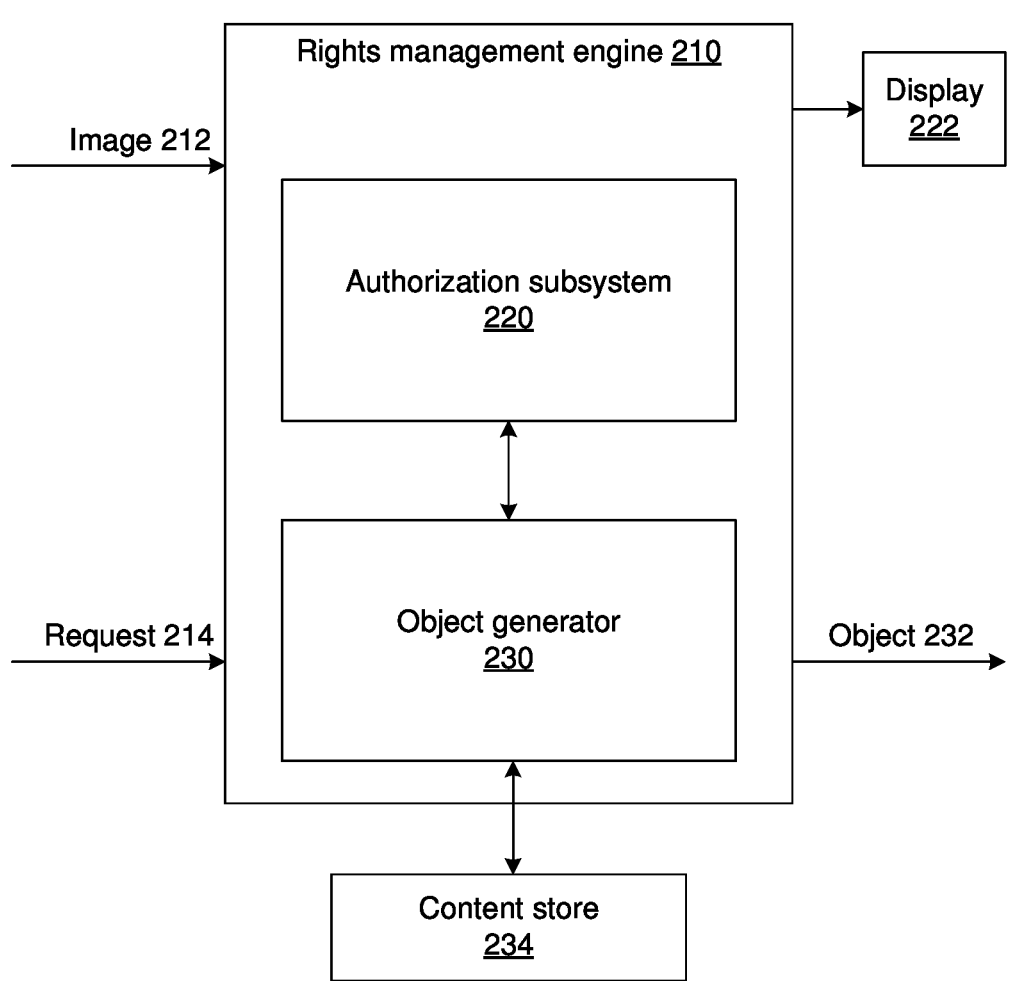
Figure 2

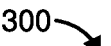
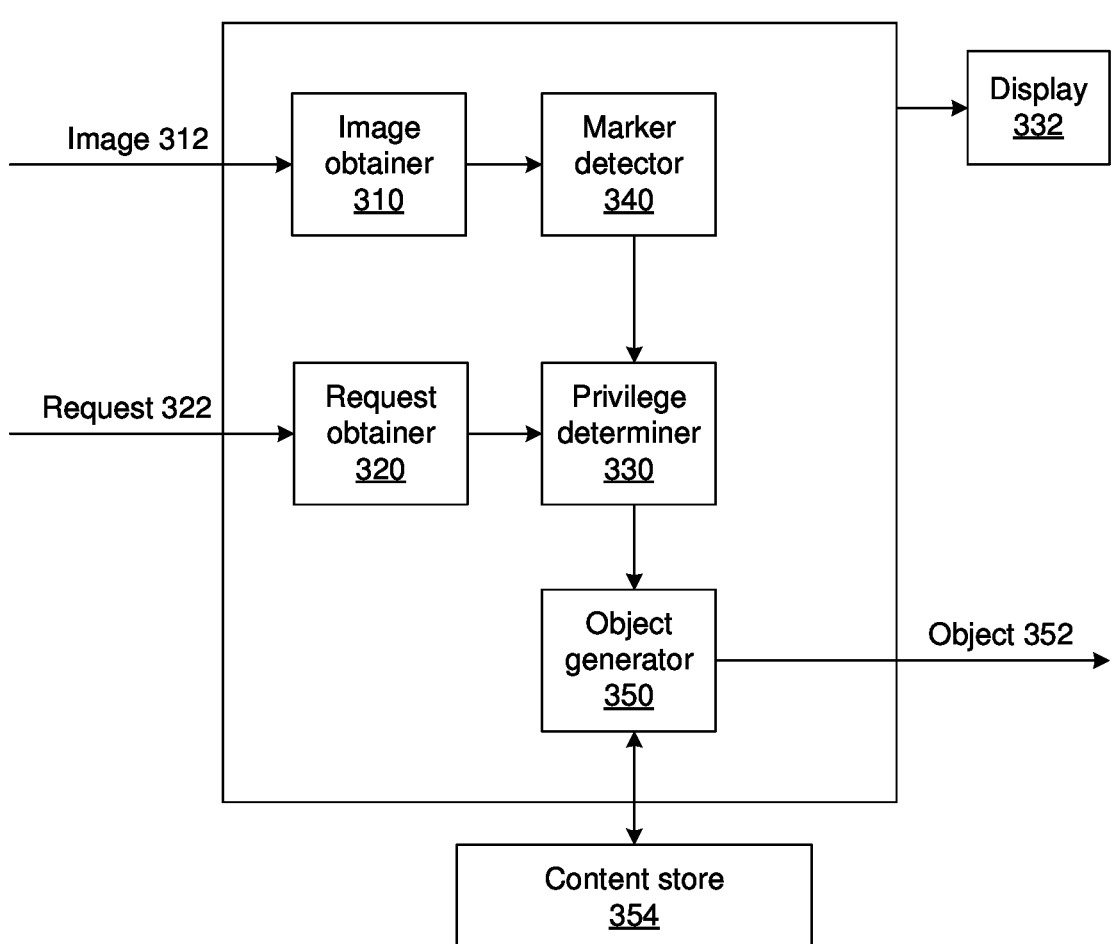
Figure 3

400

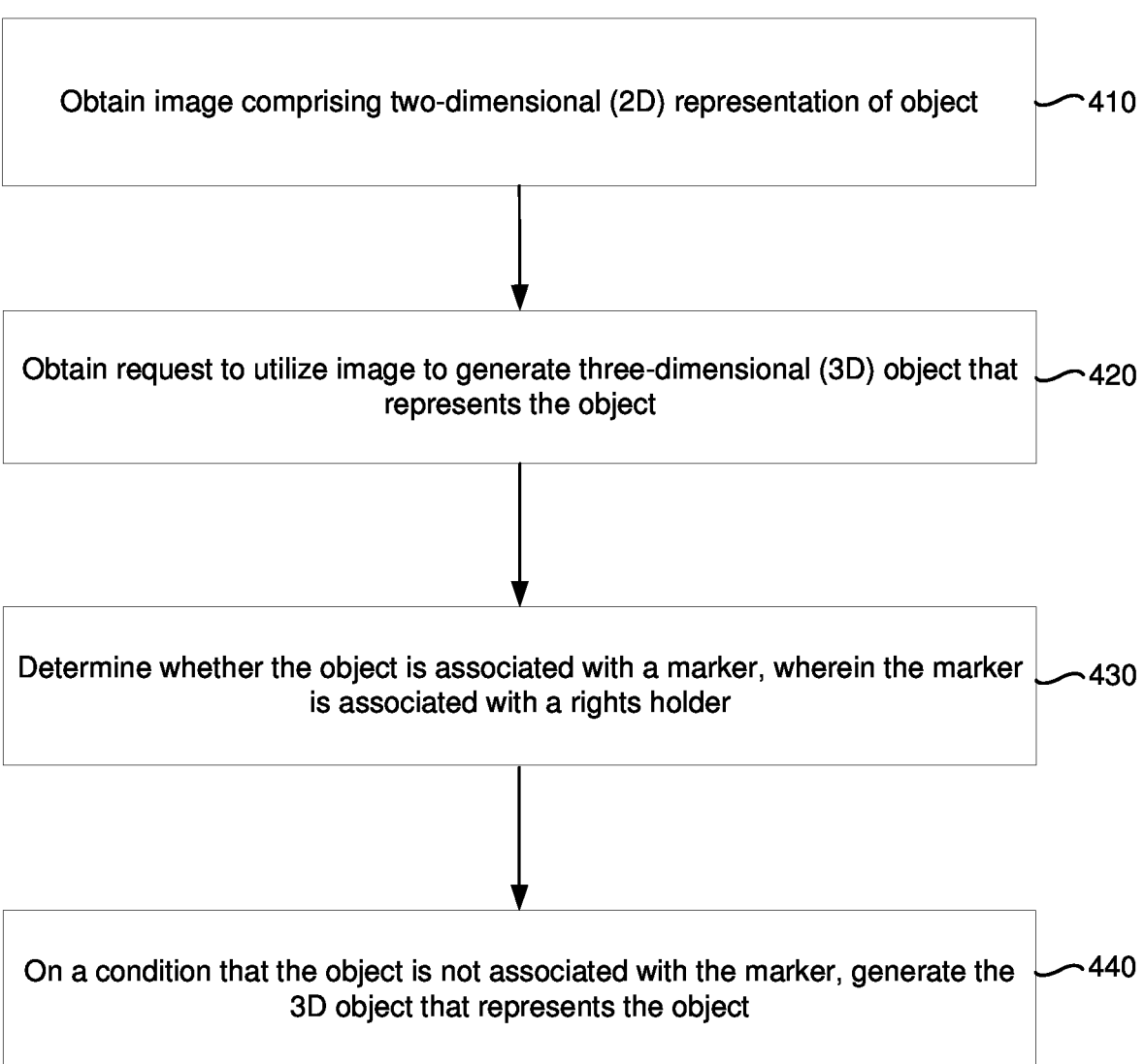

Obtain image comprising two-dimensional (2D) representation of object ⟶ 410

Obtain request to utilize image to generate three-dimensional (3D) object that represents the object ⟶ 420

Determine whether the object is associated with a marker, wherein the marker is associated with a rights holder ⟶ 430

On a condition that the object is not associated with the marker, generate the 3D object that represents the object ⟶ 440

Figure 4A

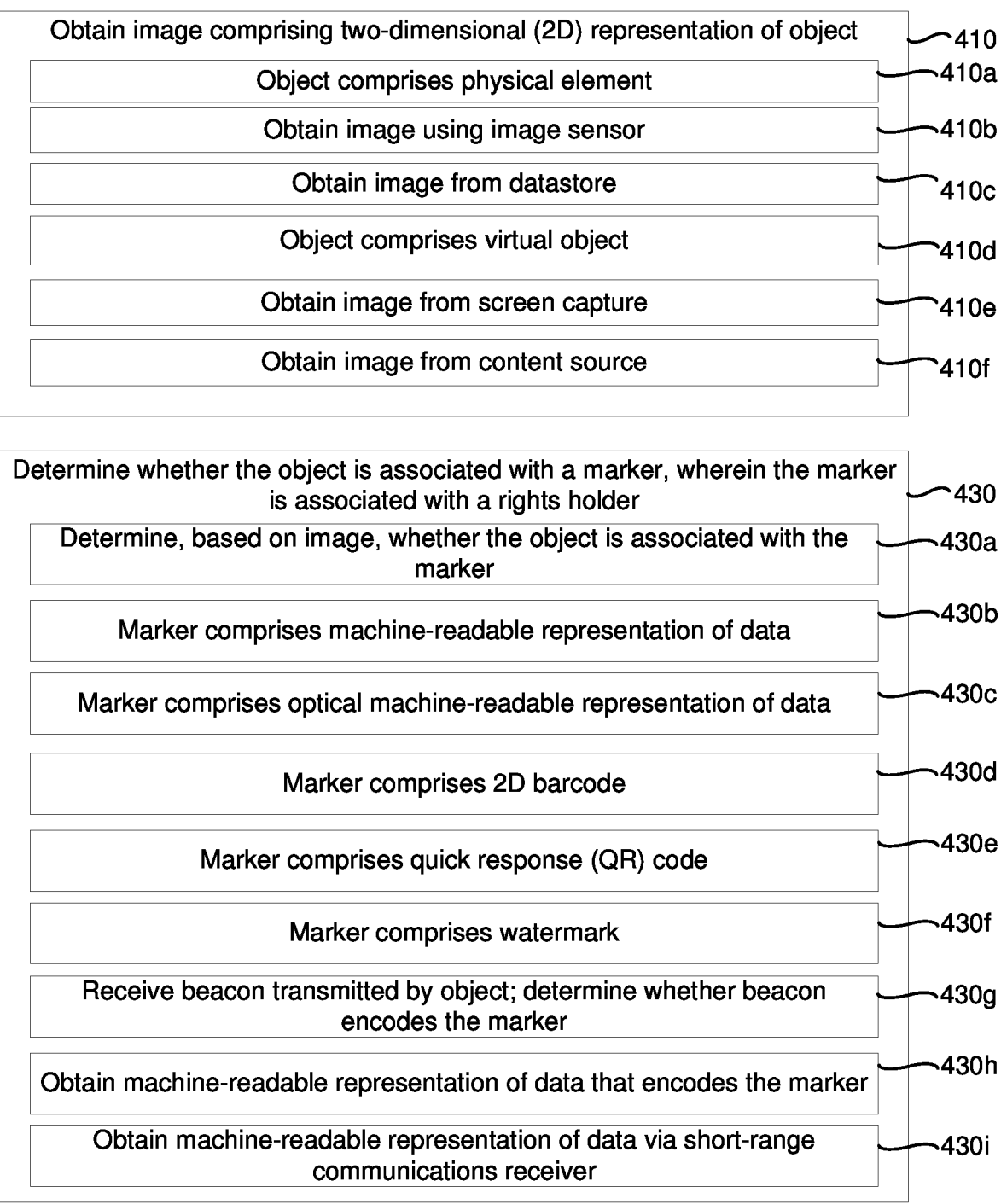

Obtain image comprising two-dimensional (2D) representation of object — 410

Object comprises physical element — 410a

Obtain image using image sensor — 410b

Obtain image from datastore — 410c

Object comprises virtual object — 410d

Obtain image from screen capture — 410e

Obtain image from content source — 410f

Determine whether the object is associated with a marker, wherein the marker is associated with a rights holder — 430

Determine, based on image, whether the object is associated with the marker — 430a Marker comprises machine-readable representation of data — 430b Marker comprises optical machine-readable representation of data — 430c Marker comprises 2D barcode — 430d Marker comprises quick response (QR) code — 430e Marker comprises watermark — 430f Receive beacon transmitted by object; determine whether beacon encodes the marker — 430g Obtain machine-readable representation of data that encodes the marker — 430h Obtain machine-readable representation of data via short-range communications receiver — 430i

Figure 4B

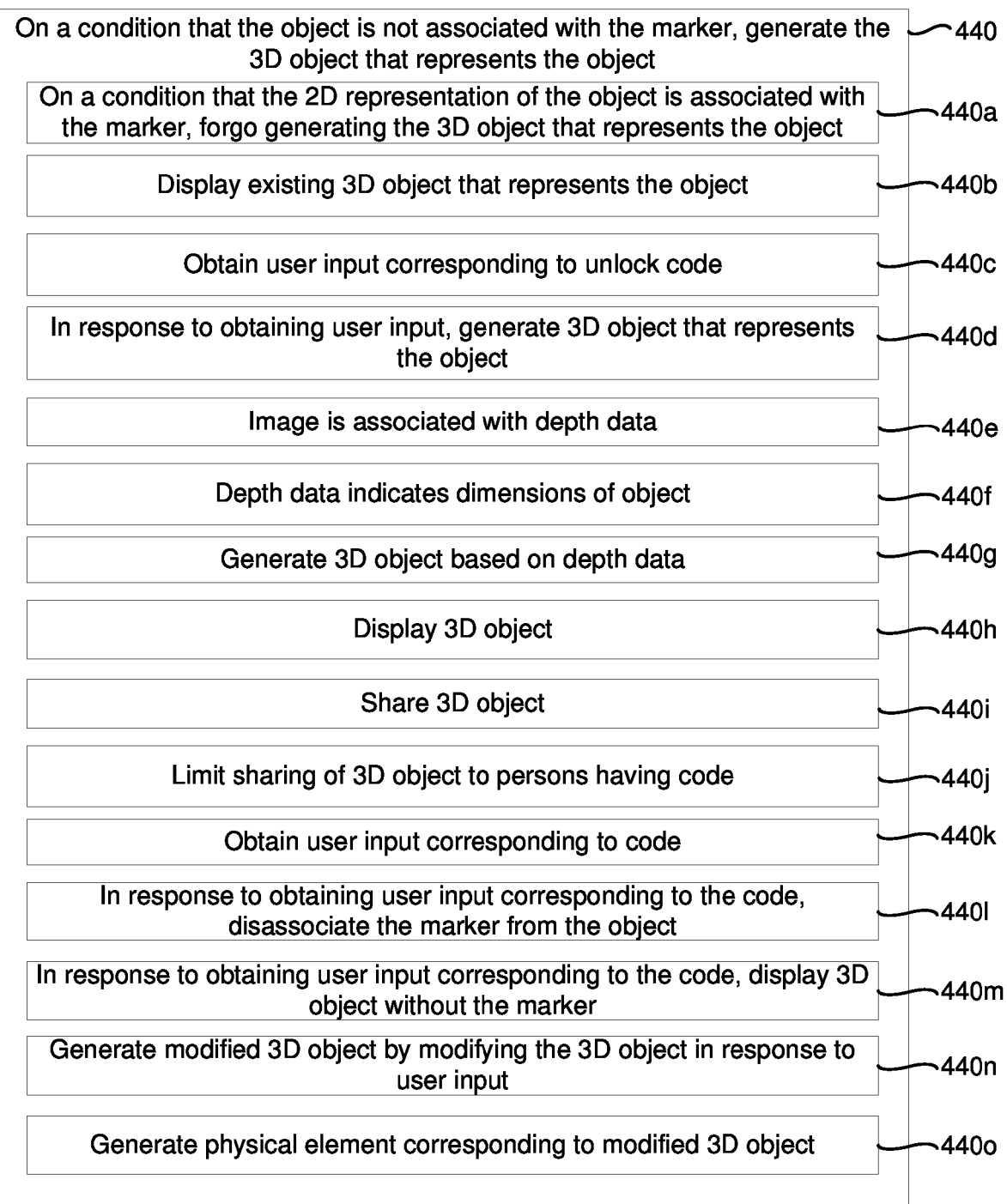

On a condition that the object is not associated with the marker, generate the 3D object that represents the object — 440

On a condition that the 2D representation of the object is associated with the marker, forgo generating the 3D object that represents the object — 440a Display existing 3D object that represents the object — 440b Obtain user input corresponding to unlock code — 440c In response to obtaining user input, generate 3D object that represents the object — 440d Image is associated with depth data — 440e Depth data indicates dimensions of object — 440f Generate 3D object based on depth data — 440g Display 3D object — 440h Share 3D object — 440i Limit sharing of 3D object to persons having code — 440j Obtain user input corresponding to code — 440k In response to obtaining user input corresponding to the code, disassociate the marker from the object — 440l In response to obtaining user input corresponding to the code, display 3D object without the marker — 440m Generate modified 3D object by modifying the 3D object in response to user input — 440n Generate physical element corresponding to modified 3D object — 440o

Figure 4C

CONTROLLING GENERATION OF OBJECTS

CROSS-REFERENCE TO RELATED APPLICATION

This application is a continuation of International Patent Application No. PCT/US21/36173, filed on Jun. 7, 2021, which claim priority to U.S. Provisional Patent App. No. 63/046,083, filed on Jun. 30, 2020, which are both hereby incorporated by reference in their entirety.

TECHNICAL FIELD

The present disclosure generally relates to controlling generation of objects.

BACKGROUND

Some devices are capable of generating and presenting graphical environments that include representations of physical elements. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 1A and 1B depict exemplary systems for use in various computer-enhanced technologies.

FIG. 2 illustrates an example system that uses markers to control generation of extended reality (XR) objects according to various implementations.

FIG. 3 is a block diagram of an example rights management engine in accordance with some implementations.

FIGS. 4A-4C are flowchart representations of a method for using markers to control generation of extended reality (XR) objects in accordance with some implementations.

Figure 5:
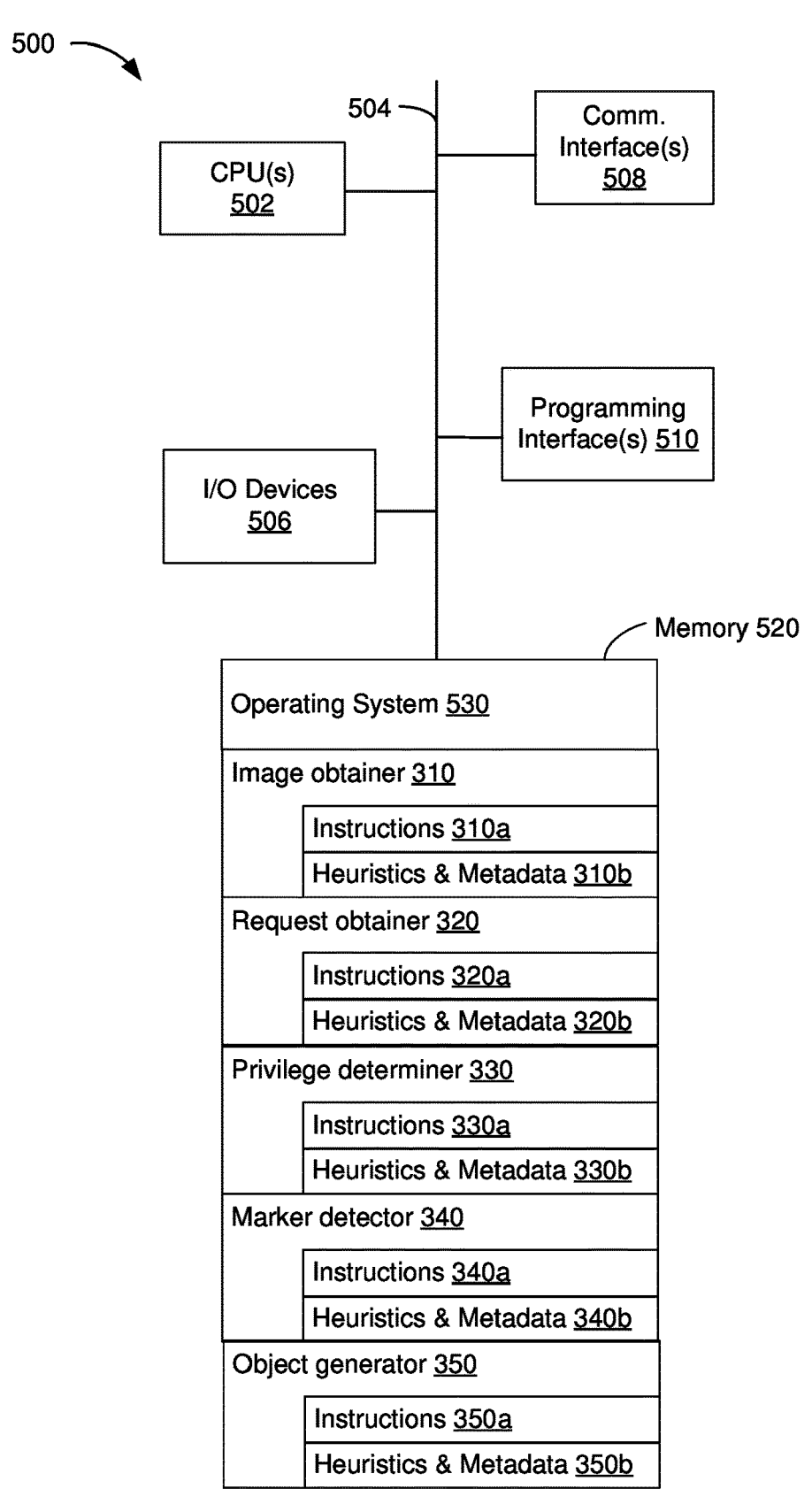
FIG. 5 is a block diagram of a device in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for using markers to control generation of extended reality (XR) objects that represent objects. In some implementations, a method includes obtaining an image comprising a two-dimensional (2D) representation of an object. A request is obtained to utilize the image to generate a three-dimensional (3D) object that represents the object. The method includes determining whether the object is associated with a marker. The 3D object that represents the object is generated if the object is not associated with the marker.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that someone may interact with and/or sense without the use of electronic devices. The physical environment may include physical features such as a physical object or physical surface. For example, a physical environment may include a physical city that includes physical buildings, physical streets, physical trees, and physical people. People may directly interact with and/or sense the physical environment through, for example, touch, sight, taste, hearing, and smell. An extended reality (XR) environment, on the other hand, refers to a wholly or partially simulated environment that someone may interact with and/or sense using an electronic device. For example, an XR environment may include virtual reality (VR) content, augmented reality (AR) content, mixed reality (MR) content, or the like. Using an XR system, a portion of a person's physical motions, or representations thereof, may be tracked. In response, one or more characteristics of a virtual object simulated in the XR environment may be adjusted such that it adheres to one or more laws of physics. For example, the XR system may detect a user's movement and, in response, adjust graphical and auditory content presented to the user in a way similar to how views and sounds would change in a physical environment. In another example, the XR system may detect movement of an electronic device presenting an XR environment (e.g., a laptop, a mobile phone, a tablet, or the like) and, in response, adjust graphical and auditory content presented to the user in a way similar to how views and sounds would change in a physical environment. In some situations, the XR system may adjust one or more characteristics of graphical content in the XR environment responsive to a representation of a physical motion (e.g., a vocal command).

Various electronic systems enable one to interact with and/or sense XR environments. For example, projection-based systems, head-mountable systems, heads-up displays (HUDs), windows having integrated displays, vehicle windshields having integrated displays, displays designed to be placed on a user's eyes (e.g., similar to contact lenses), speaker arrays, headphones/earphones, input systems (e.g., wearable or handheld controllers with or without haptic feedback), tablets, smartphones, and desktop/laptop computers may be used. A head-mountable system may include an integrated opaque display and one or more speakers. In other examples, a head-mountable system may accept an external device having an opaque display (e.g., a smartphone). The head-mountable system may include one or more image sensors and/or one or more microphones to capture images or video and/or audio of the physical environment. In other examples, a head-mountable system may include a transparent or translucent display. A medium through which light representative of images is directed may be included within the transparent or translucent display. The display may utilize OLEDs, LEDs, uLEDs, digital light projection, laser scanning light source, liquid crystal on silicon, or any combination of these technologies. The medium may be a hologram medium, an optical combiner, an optical waveguide, an optical reflector, or a combination thereof. In some examples, the transparent or translucent display may be configured to selectively become opaque. Projection-based systems may use retinal projection technology to project graphical images onto a user's retina. Projection systems may also be configured to project virtual objects into the physical environment, for example, on a physical surface or as a hologram.

In various implementations, a marker may be associated with an object, such as a physical element or an XR object. If a device detects the marker, the device may allow a user to perform certain actions with respect to the object, while disallowing the user from creating an XR object based on the object.

In some implementations, the marker is visible to the human eye. The marker may be implemented, for example, as an icon, logo, token, glyph, or machine-readable representation of data (e.g., a barcode or quick response (QR) code). In some implementations, the marker is invisible to the human eye. The marker may be implemented, for example, as an icon, logo, token, glyph, or machine-readable representation of data that is printed using fluorescent ink.

FIG. 1A is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 102 and an electronic device 104. In the example of FIG. 1A, the electronic device 104 is being used by a person (not shown). In some implementations, the electronic device 104 includes a smartphone, a tablet, a laptop, or the like.

As illustrated in FIG. 1A, the electronic device 104 obtains an image that includes a two-dimensional (2D) representation of a physical element 108. For example, an image sensor 110 may capture a still image that includes a set of pixels representing the physical element 108. In some implementations, the image sensor 110 captures a video stream comprising a plurality of video frames. One or more video frames (e.g., each video frame) may include a set of pixels representing the physical element 108.

In some implementations, the controller 102 and/or the electronic device 104 obtain a request to utilize the image to generate a three-dimensional (3D) object that represents the physical element 108. For example, a user may provide a user input corresponding to a request to create an extended reality (XR) object (e.g., a graphical object) based on the image of the physical element 108.

In some implementations, the controller 102 and/or the electronic device 104 determine whether to grant the request, in order to best comport with conditions that a rights holder has placed on its physical element 108. The determination of whether to grant the request may be based in part on permissions set by a rights holder. In some implementations, a rights holder refers to an entity that owns intellectual property (e.g., patents, copyrights, and/or trademarks) associated with the physical element 108. In some implementations, a rights holder refers to an entity that created (e.g., manufactured or designed) the physical element 108. In some implementations, the physical element 108 is the rights holder (e.g., when the physical element 108 is a person). The rights holder may sometimes be referred to as a digital rights controller or a digital rights manager.

A rights holder may associate the physical element 108 with a marker 112. The marker 112 indicates that the ability to create 3D objects based on the physical element 108 is restricted. For example, the marker 112 may indicate that creating 3D objects based on the physical element 108 is prohibited. In some implementations, the marker 112 may indicate that creating 3D objects based on the physical element 108 requires a user to input an unlock code obtained or other permission. In some implementations, the marker 112 may indicate that creating 3D objects based on the physical element 108 is permitted if the user agrees to certain conditions, e.g., by indicating assent to the conditions, such as a condition to not modify children-suitable XR content with features from other content not suitable for children. In some implementations, the marker 112 may indicate that a 3D object representing the physical element 108 may be displayed, e.g., on a display 114, but may not be exported or otherwise used unless the user inputs an unlock code.

In some implementations, the marker 112 is visible to a user of the electronic device 104. For example, the marker 112 may be implemented, for example, as an icon, logo, token, glyph, or machine-readable representation of data (e.g., a barcode or QR code) printed on the physical element 108. In some implementations, the marker 112 is invisible to the human eye. For example, in some implementations, the marker 112 is detectable via an infrared (IR) camera but not detectable a visible light camera. The marker 112 may be printed using fluorescent ink.

The marker 112 may be represented by a set of pixels in the image obtained by the electronic device 104. In some implementations, the marker 112 is represented by a subset of the set of pixels that represents the physical element 108. In some implementations, the marker 112 is represented by a set of pixels that is distinct from the set of pixels that represents the physical element 108.

In some implementations, the controller 102 and/or the electronic device 104 determines whether the physical element 108 is associated with the marker 112, e.g., whether the marker 112 is present. If the marker 112 is not present, the controller 102 and/or the electronic device 104 may generate a 3D object based on the physical element 108. If the marker 112 is present, the controller 102 and/or the electronic device 104 may prohibit the user from creating the 3D object based on the image of the physical element 108. In some implementations, if the marker 112 is present, the controller 102 and/or the electronic device 104 generate the 3D object based on the physical element 108 if an unlock condition is satisfied. For example, the controller 102 and/or the electronic device 104 may generate the 3D object based on the physical element 108 if the user inputs an unlock code after verifying a permission and/or a purchase.

In some implementations, an entity separate from the rights holder may associate the marker 112 with the physical element 108. For example, in some implementations, an entity that controls a physical setting where the physical element 108 is located may associate the marker 112 with the physical element 108. As an example, a school may associate markers with students to prevent generation of 3D objects that represent the students. As another example, a manufacturer of the electronic device 104 may associate the marker 112 with all persons to control generation of 3D objects that represent persons.

In some implementations, the marker 112 may be associated with a geofence. In such implementations, the electronic device 104 may control (e.g., prevent) generation of a 3D object that represents the physical element 108 while the electronic device 104 and/or the physical element 108 are located within the geofence. However, the electronic device 104 may allow generation of the 3D object representing the physical element 108 when the electronic device 104 and/or the physical element 108 are located outside the geofence.

FIG. 1B is a block diagram of an example operating environment 150 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 150 includes a controller 152 and an electronic device 154. In the example of FIG. 1B, the electronic device 154 is being used by a person (not shown). In some implementations, the electronic device 154 includes a smartphone, a tablet, a laptop, or the like.

In various implementations, the electronic device 154 displays an XR environment 160 on a display 162 of the electronic device 154. In some implementations, the XR environment 160 includes an XR object 158 that is associated with a marker 164. Examples of XR objects include, but are not limited to, computer-generated objects. In some implementations, the electronic device 154 obtains an image that includes a two-dimensional (2D) representation of the XR object 158. For example, in some implementations, a user of the electronic device 154 may cause the electronic device 154 to obtain a captured screen image representing the XR environment 160 that is displayed on the display 162. For example, the electronic device 154 may capture a screenshot of the XR environment 160. The captured screen image may include a set of pixels representing the XR object 158. In some implementations, the user may cause the electronic device 154 to obtain a screen recording of a video stream representing the XR environment 160 that is displayed on the display 162. The video stream may include a plurality of video frames, one or more of which may include a set of pixels representing the XR object 158.

In some implementations, the controller 152 and/or the electronic device 154 obtain a request to utilize the image to generate a three-dimensional (3D) object that represents the XR object 158. For example, a user may provide a user input corresponding to a request to create another XR object based on the XR object 158.

In some implementations, the controller 152 and/or the electronic device 154 determine whether to grant the request to generate the XR object based on the image of the XR object 158, in order to best comport with the conditions set forth by a rights holder of the XR object 158. The determination of whether to grant the request may be based in part on permissions set by a rights holder. For example, an entity may own intellectual property (e.g., patents, copyrights, and/or trademarks) associated with the XR object 158. A rights holder may associate the XR object 158 with the marker 164. In some implementations, the marker 164 indicates that the ability to create 3D objects based on the XR object 158 is restricted. In some implementations, the marker 164 indicates that creating 3D objects based on the XR object 158 is prohibited. In some implementations, the marker 164 indicates that creating 3D objects based on the XR object 158 requires a user to input an unlock code obtained. In some implementations, the marker 164 indicates that creating 3D objects based on the XR object 158 is permitted if the user agrees to certain conditions, e.g., by indicating assent to the conditions, such as a condition to not modify children-suitable XR content with features from other content not suitable for children. In some implementations, the marker 164 indicates that a 3D object representing the XR object 158 may be displayed, e.g., on the display 162, but may not be exported or otherwise used unless the user inputs an unlock code.

In some implementations, the electronic device 154 may associate the marker 164 with the XR object 158 in response to determining that the XR object 158 is of a particular type. For example, the electronic device 154 may associate the marker 164 with the XR object 158 in response to determining that the XR object 158 represents a human being (e.g., in response to determining that the XR object 158 is an avatar of a human being).

In some implementations, the marker 164 is visible to the user. For example, the marker 164 may be implemented, for example, as an icon, logo, token, glyph, or machine-readable representation of data (e.g., a barcode or QR code) represented as a subset of pixels of the set of pixels representing the XR object 158. In some implementations, the marker 164 is invisible to the human eye. For example, the marker 164 may be encoded in a subset of pixels (e.g., a single pixel) that is below a perception threshold of the human eye.

The marker 164 may be represented by a set of pixels in the image obtained by the electronic device 104. In some implementations, the marker 164 is represented by a subset of the set of pixels that represents the XR object 158. In some implementations, the marker 164 is represented by a set of pixels that is distinct from the set of pixels that represents the XR object 158.

In some implementations, the controller 152 and/or the electronic device 154 determines whether the XR object 158 is associated with the marker 164, e.g., whether the marker 164 is present. If the marker 164 is not present, the controller 152 and/or the electronic device 154 may generate a 3D object based on the XR object 158. If the marker 164 is present, the controller 152 and/or the electronic device 154 may prohibit the user from creating the 3D object based on the XR object 158. In some implementations, if the marker 164 is present, the controller 152 and/or the electronic device 154 generate the 3D object based on the XR object 158 if an unlock condition is satisfied. For example, the controller 152 and/or the electronic device 154 may generate the 3D object based on the XR object 158 if the user provides input showing that they are authorized users, e.g., inputs an unlock code.

In some implementations, the electronic device 104 or the electronic device 154 is replaced by or is attached to a head-mountable device (HMD) worn by a person. The HMD presents (e.g., displays) an XR environment (e.g., the XR environment 160 of FIG. 1B) according to various implementations. In some implementations, the HMD includes an integrated display (e.g., a built-in display) that displays the XR environment. In some implementations, the HMD includes a head-mountable enclosure. In various implementations, the head-mountable enclosure includes an attachment region to which another device with a display can be attached. For example, in some implementations, the electronic device 104 or the electronic device 154 can be attached to the head-mountable enclosure. In various implementations, the head-mountable enclosure is shaped to form a receptacle for receiving another device that includes a display (e.g., the electronic device 104 or the electronic device 154). For example, in some implementations, the electronic device 104 or the electronic device 154 slides or snaps into or otherwise attaches to the head-mountable enclosure. In some implementations, the display of the device attached to the head-mountable enclosure presents (e.g., displays) the XR environment. In various implementations, examples of the electronic device 104 or the electronic device 154 include smartphones, tablets, media players, laptops, etc.

FIG. 2 illustrates an example system 200 that uses markers to control the generation of extended reality (XR) objects that represent physical or virtual objects, according to various implementations. In some implementations, the system 200 resides at the controller 102 and/or the electronic device 104 shown in FIG. 1A, or the controller 152 and/or the electronic device 154 shown in FIG. 1B.

In some implementations, a rights management engine 210 obtains an image 212 that includes a two-dimensional (2D) representation of an object. The object may be a physical element and/or an XR object. In some implementations, the rights management engine 210 obtains the image 212 from an image sensor, such as the image sensor 110 of FIG. 1A. The image may include a set of pixels representing a physical element. In some implementations, the rights management engine 210 obtains a captured screen image representing an XR environment. The captured screen image may include a set of pixels representing an XR object. In some implementations, the rights management engine 210 obtains a screen recording of a video stream representing an XR environment. The video stream may include a plurality of video frames, one or more of which may include a set of pixels representing an XR object.

In some implementations, the rights management engine 210 obtains a request 214 to generate a three-dimensional (3D) object that represents the object that is represented in the image 212. For example, a user may submit a request to synthesize an XR object based on the object represented in the image 212.

In some implementations, an authorization subsystem 220 determines whether to authorize the request 214 to generate the 3D object. The determination of whether to authorize the request 214 may be based on whether an entity that owns intellectual property rights (e.g., patents, trademarks, and/or copyrights) associated with the object represented in the image 212 has limited the ability to generate the 3D object. In some implementations, a marker is associated with the object represented in the image 212 to indicate that an entity has limited the ability to generate the 3D object. For example, the marker may indicate that the entity prohibits creating 3D objects based on the object. In some implementations, the marker indicates that the entity allows creating 3D objects based on the object after a user inputs an unlock code obtained. In some implementations, the marker indicates that creating 3D objects based on the object is permitted if the user has reviewed conditions on uses of the object. In some implementations, the marker indicates that a 3D object may be created for the limited purpose of displaying the 3D object on a display 222, but that the 3D object may not be exported or otherwise used unless the user inputs an unlock code.

In some implementations, the marker is visible to the user. For example, the marker may be implemented, for example, as an icon, logo, token, glyph, or machine-readable representation of data (e.g., a barcode or QR code) represented as a subset of pixels of the set of pixels representing the image 212. In some implementations, the marker is invisible to the human eye. For example, the marker may be encoded in a subset of pixels (e.g., a single pixel) that is below a perception threshold of the human eye. As another example, the marker may be implemented as a beacon transmitted by a physical element represented in the image 212.

In some implementations, the authorization subsystem 220 determines whether the object represented in the image 212 is associated with the marker, e.g., whether the marker is present. If the marker is not present, the authorization subsystem 220 may authorize the request 214, and an XR object generator 230 may generate a 3D object, e.g., an XR object 232, based on the object represented in the image 212. In some implementations, the XR object generator 230 obtains data from a content store 234 to generate the XR object 232. For example, the XR object generator 230 may obtain a model of the object represented in the image 212 from the content store 234.

In some implementations, if the marker is present, the authorization subsystem 220 denies the request 214 to generate the 3D object based on the object represented in the image 212. In some implementations, if the marker is present, the authorization subsystem 220 authorizes the request 214 if (e.g., only if) an unlock condition is satisfied. For example, the user may be required to input an unlock code to indicate authorization. As another example, the user may be asked to review a list of conditions on uses of the 3D object.

FIG. 3 is a block diagram of an example rights management engine 300 in accordance with some implementations. In some implementations, the rights management engine 300 implements the rights management engine 210 shown in FIG. 2. In various implementations, the rights management engine 300 obtains an image representing a two-dimensional representation of an object and a request to create a three-dimensional object based on the object, and determines whether to grant the request based on whether the object is associated with a marker.

In some implementations, an image obtainer 310 obtains an image 312 that includes a two-dimensional (2D) representation of an object. The object may be a physical element and/or an XR object. In some implementations, the image obtainer 310 obtains the image 212 from an image sensor, such as the image sensor 110 of FIG. 1A. The image may include a set of pixels representing a physical element. In some implementations, the image obtainer 310 obtains a captured screen image representing an XR environment. The captured screen image may include a set of pixels representing an XR object. In some implementations, the image obtainer 310 obtains a screen recording of a video stream representing an XR environment. The video stream may include a plurality of video frames, one or more of which may include a set of pixels representing an XR object.

In some implementations, a request obtainer 320 obtains a request 322 to generate a three-dimensional (3D) object that represents the object that is represented in the image

312. For example, a user may submit a request to create an XR object based on the object represented in the image 312.

In some implementations, a privilege determiner 330 determines whether the user has the privilege to generate a 3D object that represents the object that is represented in the image 312. The determination of the user's privileges may be based on whether an entity that owns intellectual property rights (e.g., patents, trademarks, and/or copyrights) associated with the object represented in the image 312 has limited the ability to generate the 3D object. For example, an entity may prohibit generating the 3D object. As another example, the entity may allow creating the 3D object after the user inputs an unlock code. As another example, the entity may allow the user to preview the 3D object, e.g., the user may create a 3D object that can be viewed on a display 332 but not exported or otherwise used unless the user inputs an unlock code.

In some implementations, the entity enforces restrictions on the user's privileges using a marker that is associated with the objected represented in the image 312. The object may be visible to the user. For example, the marker may be implemented, for example, as an icon, logo, token, glyph, or machine-readable representation of data (e.g., a barcode or QR code) represented as a subset of pixels of the set of pixels representing the image 312. The marker may be invisible to the human eye. For example, the marker may be encoded in a subset of pixels (e.g., a single pixel) that is below a perception threshold of the human eye. As another example, the marker may be implemented as a beacon transmitted by a physical element represented in the image 312.

In some implementations, the rights management engine 300 determines whether the object represented in the image 312 is associated with the marker, e.g., whether the marker is present. In some implementations, a marker detector 340 identifies the marker. For example, the marker detector 340 may recognize pixels that represent the marker. In some implementations, the marker detector 340 receives and/or decodes a beacon transmitted by a physical element represented in the image 312. In some implementations, the marker is included (e.g., encoded) in metadata of the image 312. In such implementations, the marker detector 340 identifies the marker by analyzing the metadata of the image 312.

In some implementations, if the marker detector 340 detects the marker, the privilege determiner 330 denies the request 322 to generate the 3D object based on the object represented in the image 312. In some implementations, if the marker detector 340 detects the marker, the privilege determiner 330 authorizes the request 322 only if an unlock condition is satisfied. For example, the user may be required to input an unlock code.

In some implementations, if the marker detector 340 does not detect the marker, the privilege determiner 330 authorizes the request 322. An XR object generator 350 may generate a 3D object, e.g., an XR object 352, based on the object represented in the image 312. In some implementations, the XR object generator 350 obtains data from a content store 354 to generate the XR object 352. For example, the XR object generator 350 may obtain a model of the object represented in the image 312 from the content store 354.

FIGS. 4A-4D are a flowchart representation of a method 400 for controlling the generation of extended reality (XR) objects that represent physical or virtual objects, according to various implementations. In various implementations, the method 400 is performed by a device (e.g., the system 200 shown in FIG. 2 and/or the rights management engine 300 shown in FIG. 3). In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, in various implementations, the method 400 includes obtaining an image comprising a two-dimensional (2D) representation of an object and a request to utilize the image to generate a three-dimensional (3D) object that represents the object, determining whether the object is associated with a marker that is associated with a rights holder, and generating the 3D object representing the object if the object is not associated with the marker.

Referring to FIG. 4A, as represented by block 410, in various implementations, the method 400 includes obtaining an image comprising a two-dimensional (2D) representation of an object. Referring to FIG. 4B, in some implementations, as represented by block 410a, the object comprises a physical element. In some implementations, as represented by block 410b, the image is obtained using an image sensor. For example, the image sensor 110 of FIG. 1A may capture an image of a physical car.

In some implementations, as represented by block 410c, the image is obtained from a datastore. For example, the image may be obtained from a collection of images stored in a memory of the electronic device 104 of FIG. 1A.

In some implementations, as represented by block 410d, the object comprises a virtual object. For example, the object may be a virtual car. In some implementations, as represented by block 410e, the image may be obtained from a screen capture. For example, the user may activate a command to cause the electronic device 104 to capture an image of the virtual car displayed on the display 114 of FIG. 1A. In some implementations, as represented by block 410f, the image may be obtained from a content source. For example, the user may view a downloaded image of the object or a video stream that includes an image of the object.

In various implementations, as represented by block 420, the method 400 includes obtaining a request to utilize the image to generate a three-dimensional (3D) object that represents the object. For example, the user may submit a request to create a target XR object based on the object represented in the image 312. In some implementations, the target XR object is a copy of the object represented in the image. In some implementations, the target XR object has one or more characteristics in common with the object represented in the image and one or more characteristics that differ from the object represented in the image. For example, if the object represented in the image is a car, the target XR object may be a virtual car of the same make and model, but a different color.

In various implementations, as represented by block 430, the method 400 includes determining whether the object that is represented in the image is associated with a marker that is associated with a rights holder. As disclosed herein, an entity may own intellectual property rights, such as patents, trademarks, and/or copyrights, associated with the object represented in the image. The entity may use the marker to mitigate unauthorized productions of physical images into 3D objects.

In some implementations, as represented by block 430a, the method 400 includes determining, based on the image, whether the object is associated with the marker. For example, image analysis may be performed on the image to determine whether the image includes a set of pixels representing the marker. The marker may be visible to the user. For example, the marker may be implemented as an icon, logo, token, glyph, or machine-readable representation of data. In some implementations, the marker is invisible to the user. For example, the marker may be encoded in a subset of pixels (e.g., a single pixel) that is below a perception threshold of the human eye. As another example, the marker may be implemented as a larger subset of pixels having color values that differ from neighboring pixels by a differential that is below a perception threshold of the human eye.

In some implementations, as represented by block 430*b*, the marker comprises a machine-readable representation of data. Machine-readable representations of data can be implemented in different ways. For example, as represented by block 430*c*, the marker may comprise an optical machine-readable representation of data. Optical machine-readable representations of data can be implemented in different formats. In some implementations, as represented by block 430*d*, the marker comprises a 2D barcode. In some implementations, as represented by block 430*e*, the marker comprises a QR code. In some implementations, as represented by block 430*f*, the marker comprises a watermark. As disclosed herein, optical machine-readable representations of data may be implemented in formats that are visible or invisible to the human eye.

Machine-readable representations of data can also be implemented as radio frequency (RF) signals. In some implementations, as represented by block 430*g*, the method 400 includes receiving a beacon transmitted by the object and determining whether the beacon encodes the marker. For example, if the object is a physical element, the physical element may incorporate a transmitter that broadcasts a signal that is detectable by nearby electronic devices. The electronic device 104 may receive the signal and decode the signal to determine whether the signal contains a sequence of symbols corresponding to the marker. In some implementations, as represented by block 430*h*, the method 400 includes obtaining a machine-readable representation of data that encodes the marker. As represented by block 430*i*, the machine-readable representation of data may be obtained via a short-range communications receiver. For example, a physical element that is part of the object or that is associated with the object (e.g., if the object is a virtual object) may incorporate a near-field communication (NFC) tag that may be scanned at a short range (e.g., within 4 centimeters) by an electronic device with NFC capability.

In various implementations, as represented by block 440, the method 400 includes generating the 3D object that represents the object represented in the image on a condition that the object is not associated with the marker. Referring to FIG. 4C, in some implementations, as represented by block 440*a*, the method 400 includes, if the 2D representation of the object is associated with the marker, forgoing generating the 3D object that represents the object. In this way, the rights holder may prohibit creating 3D objects based on the object represented by the image.

In some implementations, as represented by block 440*b*, an existing 3D object that represents the object is displayed. For example, the rights holder may enable the user to preview a 3D object that could be generated based on the object. The rights holder may prevent the user from generating the 3D object unless the user has authorization to generate the 3D object.

In some implementations, as represented by block 440*c*, the method 400 includes obtaining a user input corresponding to an unlock code. The unlock code may be provided to the user, for example, after the user verifies a purchase to generate the 3D object. In some implementations, the unlock code is provided after the user has reviewed a list of conditions on uses of the generated 3D object. For example, the user may agree to refrain from distributing the 3D object.

In some implementations, as represented by block 440*d*, the 3D object that represents the object is generated in response to obtaining the user input. Data may be obtained from a content store to generate the 3D object. For example, a model of the object may be obtained from the content store.

Depth data may be used to generate the 3D object. For example, as represented by block 440*e*, the image of the object may be associated with depth data, e.g., obtained from a depth sensor. As represented by block 440*f*, the depth data may indicate the dimensions of the object. In some implementations, as represented by block 440*g*, the method 400 includes generating the 3D object based on the depth data.

In some implementations, as represented by block 440*h*, the method 400 includes displaying the 3D object. The 3D object may be displayed, for example, on the display 114 of FIG. 1A. In some implementations, the 3D object is displayed in an XR environment, such as a computer-generated environment.

In some implementations, as represented by block 440*i*, the method 400 includes sharing the 3D object. For example, data representing the 3D object may be transmitted to another user. As another example, a link to data representing the 3D object may be transmitted to another user. In some implementations, as represented by block 440*j*, sharing of the 3D object may be limited to persons having a code, e.g., an unlock code. In this way, the rights holder may limit the ability of secondary users to view or otherwise use generated 3D objects.

In some implementations, as represented by block 440*k*, the method 400 may include obtaining a user input that corresponds to the code. As represented by block 440l, when the user input corresponding to the code is obtained, the marker may be disassociated from the object. For example, the marker may be removed from the object. In some implementations, as represented by block 440*m*, when the user input corresponding to the code is obtained, the marker may be unmasked. For example, the 3D object may be displayed without the marker.

In some implementations, as represented by block 440*n*, the method 400 includes generating a modified 3D object by modifying the 3D object in response to a user input. For example, the user may modify one or more characteristics of the 3D object. In some implementations, the user modifies the color, texture, shape, and/or dimensions of the 3D object.

In some implementations, as represented by block 440*o*, the method 400 includes generating a physical element corresponding to the modified 3D object. For example, a model file corresponding to the modified 3D object may be outputted to a 3D printer.

FIG. 5 is a block diagram of a device 500 enabled with one or more components of a device (e.g., controller 102 and/or the electronic device 104 shown in FIG. 1A) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units (CPUs) 502, one or more input/output (I/O) devices 506 (e.g., the display 114 shown in FIG. 1A and/or a speaker), one or more communication interface(s) 508, one or more programming interface(s) 510, a memory 520, and one or more communication buses 504 for interconnecting these and various other components.

In some implementations, the communication interface 508 is provided to, among other uses, establish, and maintain a metadata tunnel between a cloud-hosted network management system and at least one private network including one or more compliant devices. In some implementations, the one or more communication buses 504 include circuitry that interconnects and controls communications between system components. The memory 520 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 520 optionally includes one or more storage devices remotely located from the one or more CPUs 502. The memory 520 comprises a non-transitory computer readable storage medium.

In some implementations, the memory 520 or the non-transitory computer readable storage medium of the memory 520 stores the following programs, modules and data structures, or a subset thereof including an optional operating system 530, the image obtainer 310, the request obtainer 320, the privilege determiner 330, the marker detector 340, and the XR object generator 350. As described herein, the image obtainer 310 may include instructions 310*a* and/or heuristics and metadata 310*b* for obtaining an image that includes a two-dimensional (2D) representation of an object. As described herein, the request obtainer 320 may include instructions 320*a* and/or heuristics and metadata 320*b* for obtaining a request to generate a three-dimensional (3D) object that represents the object that is represented in the image. As described herein, the privilege determiner 330 may include instructions 330*a* and/or heuristics and metadata 330*b* for determining whether the user has the privilege to generate a 3D object that represents the object that is represented in the image. As described herein, the marker detector 340 may include instructions 340*a* and/or heuristics and metadata 340*b* for identifying the marker, e.g., by recognizing pixels that represent the marker or by decoding a signal transmitted by a physical element. As described herein, the XR object generator 350 may include instructions 350*a* and/or heuristics and metadata 350*b* for generating a 3D object, e.g., an XR object, based on the object represented in the image.

It will be appreciated that FIG. 5 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 5 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

What is claimed is:

1. A method comprising:

at a device including a display, a non-transitory memory, and one or more processors coupled with the non-transitory memory:

obtaining an image comprising a two-dimensional (2D) representation of an object;

obtaining a request to utilize the image to generate a three-dimensional (3D) object that represents the object, the request identifying the 2D representation in the image as a target for the generation of the 3D object;

determining, based on the image, whether the 2D representation of the object is marked with a marker, the marker encoding a restriction on generating the 3D object that represents the object; and in response to determining that the object is marked with the marker, generating the 3D object that represents the object, wherein the marker marking the 2D representation of the object is removed from the generated 3D object.

2. The method of claim 1, wherein the object is a physical object.

3. The method of claim 1, wherein the device comprises an image sensor and wherein obtaining the image comprises capturing the image via the image sensor of the device.

4. The method of claim 1, wherein obtaining the image comprises retrieving the image from a datastore.

5. The method of claim 1, wherein the object comprises a virtual object that is displayed in a graphical environment; and wherein obtaining the image comprises capturing a screenshot of the virtual object.

6. The method of claim 1, wherein the marker comprises an optical machine-readable representation of data.

7. The method of claim 1, wherein the marker comprises 3D visual content.

8. The method of claim 1, wherein the marker comprises a quick response (QR) code.

9. The method of claim 1, wherein the marker comprises a watermark.

10. The method of claim 1, further comprising:

obtaining a user input corresponding to an unlock code; and in response to obtaining the user input corresponding to the unlock code, generating the 3D object that represents the object.

11. The method of claim 1, wherein the image is associated with depth data of the object represented by the 2D representation.

12. The method of claim 11, wherein generating the 3D object comprises generating the 3D object using the depth data.

13. The method of claim 1, further comprising:

displaying the 3D object on the display.

14. The method of claim 1, wherein the marker comprises at least one of an icon, logo, token, glyph, or a fluorescent ink-printed machine-readable representation of data.

15. A device comprising:

one or more processors;

a non-transitory memory; and one or more programs stored in the non-transitory memory, which, when executed by the one or more processors, cause the device to:

obtain an image comprising a two-dimensional (2D) representation of an object;

obtain a request to utilize the image to generate a three-dimensional (3D) object that represents the object, the request identifying the 2D representation in the image as a target for the generation of the 3D object;

determine, based on the image, whether the 2D representation of the object is marked with a marker, the marker encoding a restriction on generating the 3D object that represents the object; and in response to determining that the object is marked with the marker, generate the 3D object that represents the object, wherein the marker marking the 2D representation of the object is removed from the generated 3D object.

16. The device of claim 15, wherein the marker comprises an optical machine-readable representation of data.

17. The device of claim 15, wherein the one or more programs further cause the device to:

obtaining a user input corresponding to an unlock code; and in response to obtaining the user input corresponding to the unlock code, generating the 3D object that represents the object.

18. A non-transitory memory storing one or more programs, which, when executed by one or more processors of a device, cause the device to:

obtain an image comprising a two-dimensional (2D) representation of an object;

obtain a request to utilize the image to generate a three-dimensional (3D) object that represents the object, the request identifying the 2D representation in the image as a target for the generation of the 3D object;

determine, based on the image, whether the 2D representation of the object is marked with a marker, the marker encoding a restriction on generating the 3D object that represents the object; and in response to determining that the object is marked with the marker, generate the 3D object that represents the object, wherein the marker marking the 2D representation of the object is removed from the generated 3D object.

19. The non-transitory memory of claim 18, wherein the one or more programs further cause the device to:

obtain a user input corresponding to an unlock code; and in response to obtaining the user input corresponding to the unlock code, generate the 3D object that represents the object.

20. The non-transitory memory of claim 18, wherein the marker comprises an optical machine-readable representation of data.

* * * * *